United States Patent [19]

Follett

[11] Patent Number: 4,663,881

[45] Date of Patent: May 12, 1987

[54] DISINTEGRATING CASTING WEIGHT AND FISH ATTRACTOR

[76] Inventor: John L. Follett, 14554 Richmond Ave., Fair Haven, N.Y. 13064

[21] Appl. No.: 717,039

[22] Filed: Mar. 28, 1985

[51] Int. Cl.$^4$ .............................................. A01K 95/00
[52] U.S. Cl. .................................... 43/43.12; 43/43.14
[58] Field of Search ............................ 43/43.12, 43.14

[56] References Cited

U.S. PATENT DOCUMENTS

| | | | |
|---|---|---|---|
| 2,687,592 | 8/1954 | Purcell | 43/43.12 |
| 2,791,860 | 5/1957 | Mecate et al. | 43/43.12 |
| 3,393,467 | 7/1968 | Potter et al. | 43/43.12 |
| 3,415,005 | 12/1968 | Gilham | 43/43.12 |
| 3,834,059 | 9/1974 | Overstreet | 43/43.12 |
| 4,501,083 | 2/1985 | Ong | 43/4.5 |

FOREIGN PATENT DOCUMENTS 1054574 10/1953 France ................................ 43/43.12

OTHER PUBLICATIONS

The Random House College Dictionary © 1980, pp. 785 and 1034.

*Primary Examiner*—M. Jordan
*Attorney, Agent, or Firm*—Charles S. McGuire

[57] ABSTRACT

A water-soluble weight is disclosed for attachment to a fishing line, hook or lure by means of a closed loop of thread or string embedded in and extending from the weight which is preferably of essentially hemispherical shape. The weights are formed by filling appropriately shaped cavities in a mold with a mixture consisting essentially of water, soil (preferably a silt-clay mixture having a USDA texture of silt loam) and 10-30 mesh stone. The mold rests upon a layer of resilient material (e.g., sponge rubber) which in turn is attached to a rigid layer mounted by resilient means upon a base plate. Openings in the resilient layer overlie recesses in the rigid layer, the openings and recesses being aligned with openings in the bottom of each mold cavity to permit insertion, with the aid of a tool having a notched end, of the thread or string through the mixture in the mold cavity into the underlying recess. The mold apparatus is attached to a shaker table and vibrated, both before and after insertion of the string, and a blotter material is placed over the mold, in contact with the upper surface of the mixture, which is then dried and removed from the mold cavities. An additional material, such as a fish-attracting food and/or scent, may be incorporated in the weights prior to drying.

4 Claims, 9 Drawing Figures

DISINTEGRATING CASTING WEIGHT AND FISH ATTRACTOR

REFERENCE TO DISCLOSURE DOCUMENTS

This application contains subject matter from Disclosure Documents Nos. 116,076 and 121,073, submitted Mar. 29, 1983 and Sept. 27, 1983, respectively.

BACKGROUND OF THE DISCLOSURE

The present invention relates to disintegrating, i.e., water-soluble, casting weights for attachment to fishing lines, hooks or lures and to novel methods and apparatus used in the fabrication thereof. More particularly, the invention relates to dissolving casting weights of improved qualities and construction, as well as molding apparatus and techniques useful in the fabrication of the improved weights.

In many types of fishing situations it is necessary or desireable to add weight to the hook-carrying end of the line to assist in casting the hook to a point in the water at some distance from the fisherman. Where it is desired for the hook to remain submerged, the weight may be attached in a permanent or semi-permanent manner to provide a "sinker" as well as a casting weight. However, such weights are unsuitable where the hook is to be located at or near the surface during fishing.

A number of types of casting weights have been proposed which dissolve or otherwise disintegrate upon, or a short time after, contact with the water. Among the materials used for such weights are ice (see U.S. Pat. Nos. 3,415,005 and 4,186,907) and compositions of various substances with a binder such as cornstarch or sugar (see U.S. Pat. Nos. 3,393,467 and 3,834,059). Also, various means have been employed to secure such weights to the fishing line, hook or lure. However, the disintegrating casting weights of the prior art have been subject to a number of limitations, among the most serious of which is that they are not suitable for fly fishing using spin casting equipment with light, monofilament line.

It is a principal object of the present invention to provide a fishing line casting weight of the water-soluble type having improved qualities of initial hardness, shape retention and avoidance of disintegration, while dissolving rapidly with fish-attracting properties upon entering the water.

Another object is to provide a dissolving casting weight consisting of a minimum of readily available, inexpensive materials, particularly well suited for fly fishing.

A further object is to provide a solid casting weight, formed from an initially moldable material, having improved means for attachment to a fishing line, hook or lure.

Still another object is to provide novel and improved methods and apparatus useful in the fabrication of solid, water-soluble, casting weights for attachment to a fishing line, hook or lure from an initially moldable mixture.

Other objects will in part be obvious and will in part appear hereinafter.

SUMMARY OF THE INVENTION

In accordance with the foregoing objects, the invention comprises a casting weight and fish attractor having a substantially hemispherical shape with one end flat and one rounded. A closed loop of thread or string, preferably of a material which will sink in water and is bio-degradable, extends from the rounded end, at least a major portion of the length of the string being embedded within the weight. The composition of the weight is entirely 10-30 mesh stone, preferably from at least 50% to about 85%, and the remainder a natural soil having a silt-loam texture, being a mixture of predominatly silt and clay.

The preferred apparatus for fabrication of the weights includes an open-topped mold having a plurality of appropriately shaped cavities with rounded lower ends at the center of which an opening extends through the mold. The lower, planar surface of the mold rests upon a layer of resilient material through which a plurality of openings extend in vertical alignment with the openings in the mold. The resilient layer is attached to an underlying rigid layer which is provided with recesses in its upper surface aligned with the openings in the resilient layer and the mold. In addition, a plurality of smaller openings extend continuously through the superposed resilient and rigid layers for venting purposes. The rigid layer is mounted, preferably by resilient means such as rubber pads, upon and in upwardly spaced relation to a base plate. A conventional, mechanical vibrator or shaker table is provided with a pair of spaced guides or tracks between which the edges of the base plate are placed and the mold, resting upon the underlying structure, is clamped to the table.

With the apparatus so assembled, the mold cavities are filled with the mixture of stone and soil with sufficient water so that the material is in moldable form. An initial vibration is imparted by actuating the shaker table to settle the material in the mold cavities, and any excess material is removed by passing a straight edge over the upper surface of the mold. The vibration is stopped and a plate is placed over the mold surface with openings in the plate aligned with the center of each mold cavity. A length of thread or string is then inserted by engaging an intermediate portion thereof with the notched end of a thin, elongated rod and passing the rod through an opening in the plate, serving as a guide, through the material in the cavity and the lower opening therein and into the recess in the underlying, rigid plate. The rod is then removed, leaving the string embedded in the material in the mold with the intermediate portion extending downwardly forming a small, closed loop and preferably one or both ends of the string extending out of the upper surface of the material.

The guide plate is then removed and the mold apparatus and material therein subjected to a second vibration. An absorbent material such as a paper towel is then placed over the surface of the mold, contacting the upper surface of the wet material in the cavities. A resilient roller is then passed over the absorbent material, thus removing some of the water from the surface of the material in the cavities and embedding the upper ends of the string therein with at least one end portion preferably extending past the edge of the material. This forms a stronger bond between the string and the body of the material to prevent separation during casting.

The mold is then removed from the supporting structure, and a low pressure air spray is applied over the lower surface of the mold to remove water and other materials from the loops.

The material in the cavities is then thoroughly dried, preferably by heating for a sufficient time. The finished items may then be removed from the mold and are ready for use. If desired, an additional material such as a scent or other fish attractant may be embedded in or applied to the material, to be released when the weights enter the water and dissolve.

DETAILED DESCRIPTION

Figures 1, 2, 3:
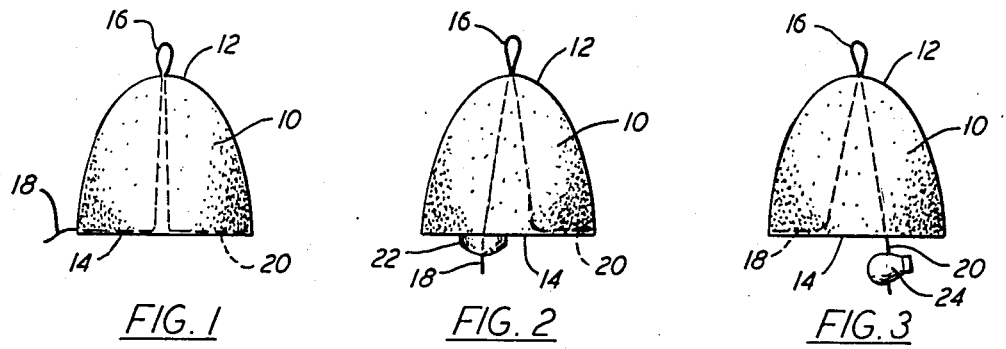
FIG. 1 is an elevational view of the casting weight and fish attractor in a preferred embodiment.
FIGS. 2-5 are elevational views of various modified forms of the weight.

Referring now to the drawings, in FIG. 1 is shown a representative example of the article of manufacture of the invention, namely, a casting weight and fish attractor for attachment to a fishing line, hook or lure. The weight includes a solid body portion 10 of substantially hemispherical shape, having rounded end 12 and flat surface 14. A flexible material such as a length of thread or string (hereinafter referred to as string) includes closed loop portion 16 extending from rounded end 12 and end portions 18 and 20 extending out from flat surface 14 or, preferably, fully or partly embedded in such surface substantially as shown in FIG. 1. The preferred material forming body portion 10, as well as methods and apparatus employed in the fabrication thereof, will be discussed in detail later herein.

In use, the hook attached to the end of a fishing line or leader, either directly or by being affixed to a fly, lure or other artificial bait, is placed through closed loop 16. The hook and bait may then be cast or thrown a considerably greater distance and placed with greater accuracy by virtue of the momentum provided by the weight of body portion 10, such weight being on the order of ¼ ounce or greater, as desired. Upon entering the water, body portion 10, by its water soluble nature, begins to dissolve and is released from the hook after a few seconds, the time period being selectively variable in accordance with the nature of body portion 10, as also discussed later herein.

In FIGS. 2 and 3 are illustrated modified forms of the weight for use where it is desired to insure that the string will be disengaged from the hook after body portion 10 disintegrates. In FIG. 2, one of end portions 18 and 20 is not embedded in surface 14, but extends therefrom for attachment of additional string removing means. A slow dissolving material (i.e., slower than body portion 10) such as a gelatin is provided in the nature of saucer shaped disc 22, applied at time of manufacture, in initially liquid form to surface 14, surrounding and attaching to end portion 18. Thus, when body portion 10 dissolves, disc 22 forms a water anchor or drag, causing the string to disengage from the hook, when the line is retrieved. In the modification of FIG. 3, a conventional, soft metal, pinch-on sinker 24 is secured to end portion 20, which is preferably initially embedded in the end of the weight, as in FIG. 1, and pulled free for attachment of sinker 24. Sinker 24 provides additional weight as well as insuring that the string will disengage from the hook after disintegration of body portion 10. The embodiments of both FIGS. 2 and 3 are particularly useful in fly fishing, as when very light lures or flies are used, especially with monofilament line, both to provide the necessary weight and to submerge an artificial insect of the type which is initially submerged and rises to the surface, or remains submerged.

Figures 4, 5:
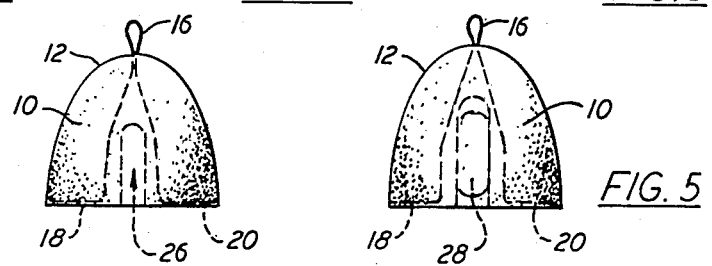

Since the nature of body portion 10 and the manner of fabrication thereof, as described later, causes bubbles to form and rise in the water as the weight dissolves, this serves as a natural attractant for many types of fish. The disintegration of the weight causes the water to become turgid or roiled which, in combination with the bubbles produced by the entrapped air in the material, closely simulates the conditions under which many types of fish seek food. In some situations, an additional attractant such as a natural fish food or extract thereof, and/or additional scent to which certain species of fish are attracted, may be added, if desired. Body portion 10 may be formed with a cavity, such as that shown in FIG. 4 extending into surface 14 and denoted by reference numeral 26, so that a fisherman may inject or insert a fish attractant of his choice. Alternatively, attractant 28 may be incorporated in body portion 10, as shown in FIG. 5, during fabrication thereof and may, if desired, be segregated from the material of body portion 10 by a suitable sealant.

Figure 6:
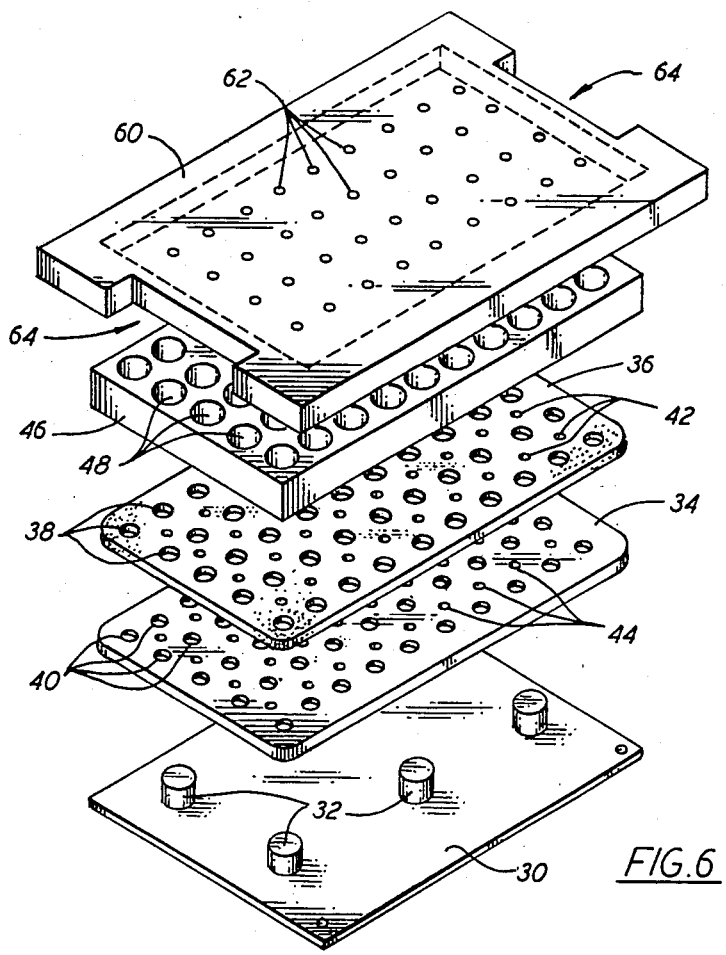
FIG. 6 is an exploded, perspective view of a preferred form of apparatus for use in fabricating weights such as those shown in FIGS. 1-5.

Turning now to FIG. 6, a preferred form of apparatus for fabricating the casting weights and fish attractors of the invention is shown. Rigid base plate 30 is attached by legs or pads 32, preferably of rubber or other resilient material, to rigid layer 34. Resilient layer 36, of sponge rubber or other like material, is cemented or otherwise secured to rigid layer 34 with a first array of openings 38 in resilient layer 36 in registration with a like array of recesses 40 in the upper surface of rigid layer 34. A second array of openings 42 in the resilient layer are aligned with openings 44 so that the openings 42 and 44 extend continuously through layers 34 and 36. Such openings may also extend through resilient pads 32 and base plate 30 if aligned therewith in layers 34 and 36.

Figure 7:
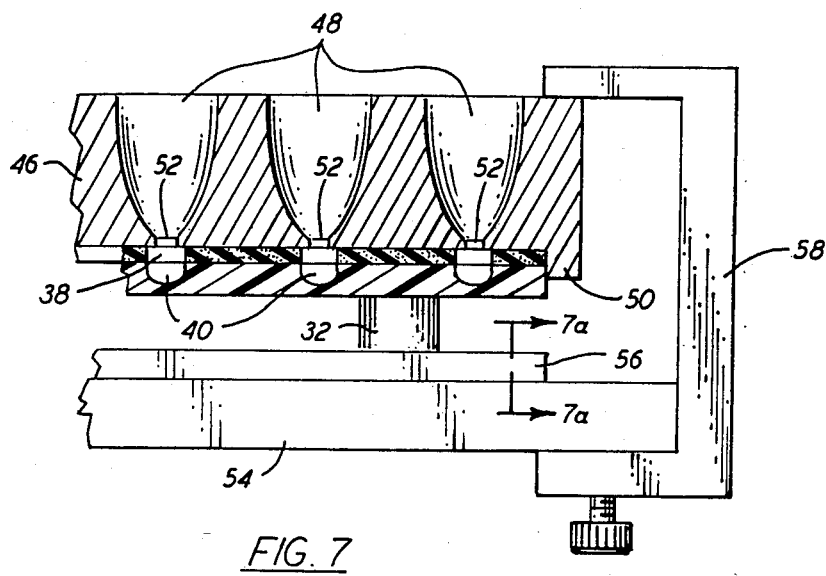
FIG. 7 is a fragmentary, side elevational view, in section, of a portion of the apparatus of FIG. 6 in the assembled condition.
Figure 7A:
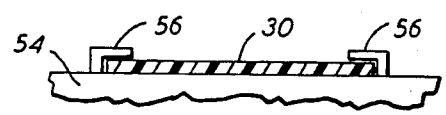
FIG. 7a is a small-scale cross section on the line 7a–7a of FIG. 7.

Mold member 46 is formed from a suitable plastic, or other material commonly used for such purpose, with an array of cavities 48 having a shape corresponding to the desired final shape of the casting weights, e.g., a substantially hemispherical or ovoid shape. The lower surface of mold member 46 is recessed to provide a peripheral border fitting the outside dimensions of layers 34 and 36, whereby the mold member may be placed upon resilient layer 36 with the latter fitting inside the peripheral border on the mold member, a portion of which is indicated in FIG. 7 by reference numeral 50. When so positioned, the center of each of mold cavities 48 is aligned with one of openings 38 and recesses 40.

Openings 52 extend through the lower side of mold member 46 at the center of the lower, curved surface of each of cavities 48. Thus, when mold member 46 is positioned on resilient layer 36 as described, mold openings 52 directly overlie openings 38 and recesses 40. The assembled items are placed on a conventional shaker table, a portion of which is indicated in FIG. 7 by reference numeral 54, provided in known manner with suitable oscillating or vibrating means (not shown). Base plate 30 is inserted between a pair of guide tracks 56 affixed to the table surface, and the apparatus is secured at each end to the table by clamps, one of which is indicated by reference numeral 58 in FIG. 7, pressing the lower surface of mold member 46 into sealing engagement with resilient layer 36.

Mold cavities 48 are then filled with the mixture from which the casting weights are formed. It has been found that the properties of the finished items are optimized by using a mixture consisting only of fine aggregate or stone (hereinafter referred to as aggregate) with a suitable, natural soil composition and sufficient water to render the mixture moldable. A suitable mixture has been prepared using aggregate, soil and water in approximate relative proportions of 60%, 25% and 15% (by weight) respectively. All, or substantially all, of the water is later removed by drying, leaving a finished item composed of approximately 70% aggregate and 30% soil. The aggregate is a stone preferably of a size small enough to pass a 10 mesh screen (10 openings per linear inch) and large enough not to pass a 30 mesh screen. The soil is a mixture of predominantly silt and clay with a USDA texture of silt loam (SiL) or silt clay loam (SiCL) and also some, but preferably little sand, and combinations thereof. Particle size analysis of a preferred, naturally occurring soil which has been used in fabrication of the casting weights has shown the material to consist of 72.4% silt, 25.2% clay and 2.4% sand. The silt is about one-half medium and one-fourth each coarse and fine silt, the clay is predominantly illitic, and the sand is substantially all fine or very fine sand.

After mold cavities 48 are filled the vibrating mechanism of shaker table 54 is actuated and an initial vibration imparted to the mold and its supporting apparatus so that the mixture is well settled in the cavities. Vibration is stopped, excess material is removed from the top surface of mold member 46 by passing a straight edge thereover with a reciprocating motion, and perforated plate 60 (FIGS. 6 and 8), formed of a transparent sheet of plastic or other rigid material, is placed on the upper surface of mold member 46. Plate 60 is larger in length and width than mold member 46 and is provided with a recess in the lower surface of the approximate dimensions of the mold member so as to fit thereon with each of openings 62 in plate 60 in registration with the center of mold cavities 48. Cut-out areas 64 in the ends of plate 60 are provided to accommodate clamps 58 so that the plate may lie flat on the surface of mold member 46.

Figure 8:
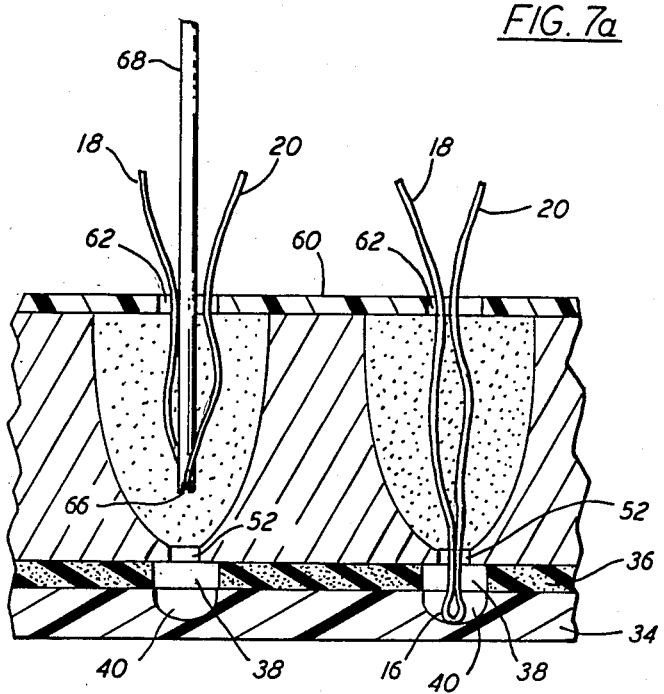
FIG. 8 is an enlarged, fragmentary, elevational view of portions of the apparatus, illustrating a step in the preferred method of fabrication of the weights.

The lengths of string are then inserted in the mixture in the mold cavities by engaging a medial portion of the string through notch 66 in the end of elongated rod 68. Openings 62 serve as a guide, through which the notched end of rod 68 is inserted. Rod 68 is forced downwardly, through the mixture of material in mold cavity 48, through opening 52 at the bottom of the mold cavity, opening 38 in resilient layer 36 and into recess 40 in rigid layer 34. When rod 68 is withdrawn, the string remains, forming closed loop 16 extending out of the lower, curved end of the material in the mold and free ends 18 and 20 extending out of the upper, flat end, as indicated in FIG. 8. The resilience provided by layer 36 assists in the insertion of rod 68 and the proper seating of loop 16 in recess 40, for example, if solid material passes from the mold cavity into opening 38 and recess 40, resilient layer 36 may expand somewhat as rod 68 is forced downwardly to accommodate the rod end and loop 16.

After the strings have been inserted through the material in all of the mold cavities, whether one at a time or several (or all) at once by simultaneous movement of a plurality of notched rods, plate 60 may be removed from the upper surface of mold member 46. The shaker table is then actuated again and the mold and supporting structure subjected to a second vibration for a suitable time to compact the mixture and to seat it firmly about the imbedded string. A liquid absorbent material such as a layer of paper towels is then placed over the upper surface of mold member 46 which serves to place ends 18 and 20 in close contact with the upper surface of the material in the mold cavities, as well as to absorb some of the water which has risen to the surface during vibration of the mold apparatus. Preferably, a roller of resilient material is passed a few times over the surface of the absorbent material, thereby embedding all or most of string ends 18 and 20 in the upper surface of the material in the mold cavities.

Clamps 58 are then released and mold member 46 is removed from the supporting structure. Openings 42 and 44, extending continuously through layers 36 and 34, respectively, facilitate the removal of mold member 46 from resilient layer 36. A low pressure air spray is preferably passed over the lower surface of mold member 46 to remove any material which may have passed through the lower mold openings during vibration from closed loops 16 extending from the bottom of the mold member. Actually, very little of the mixture will pass through openings 52 and 38, which is preferred, due to the seal between mold member 46 and resilient layer 36. The material in mold cavities 48 is then dried, removing essentially all of the water, by placing mold member 46, with the absorbent layer still in place, in an oven or other drying chamber for a suitable time period. It will be noted that mold member 46 rests upon peripheral border 50 during the drying operation, permitting loops 16 to extend freely from the lower surface of the mold and remain open. After drying, the absorbent layer is removed and the finished items are removed from the mold by inverting and tapping it, e.g., with a small Nylon mallet.

What is claimed is:

1. A water soluble weight for engagement with a fishing line, hook or lure to assist in casting the hook and in attracting fish thereto, said weight comprising:
   (a) a body member consisting essentially of a dried mixture of between about 50% and 85% stone which passes a 10 mesh screen but does not pass a 30 mesh screen, and the remainder a soil having a silt-loam texture, said body member being rounded on one end and flat on the other end; and
   (b) a length of flexible, non-floating biodegradable material extending between first and second ends, an intermediate portion of said material extending from said rounded end of said body member to form a closed loop, and from said loop through said body member to said other end thereof, a portion of said material adjacent at least one end thereof extending laterally across said flat end of said body and being embedded therein.

2. The invention according to claim 1 wherein said flexible material extends through said body from each side of said closed loop to a central position on said flat end of said body member and thence across the surface of said flat end, at least one of the terminal ends of said material being free from engagement with said body member.

3. The invention according to claim 2 wherein a cavity extends into said body member from said flat end thereof and said flexible material extends from said loop through said body portion adjacent to said cavity, to said flat end.

4. The invention according to claim 3 and further including a fish attractant material in said cavity.

* * * * *